United States Patent
Beck et al.

(10) Patent No.: US 10,948,050 B2
(45) Date of Patent: Mar. 16, 2021

(54) TRANSMISSION FOR A MOTOR VEHICLE

(71) Applicant: ZF Friedrichshafen AG, Friedrichshafen (DE)

(72) Inventors: Stefan Beck, Eriskirch (DE); Johannes Kaltenbach, Friedrichshafen (DE); Michael Wechs, Weissensberg (DE); Michael Trübenbach, Friedrichshafen (DE); Kai Bornträger, Langenargen (DE); Johannes Glückler, Friedrichshafen (DE); Jens Moraw, Markdorf (DE); Gerhard Niederbrucker, Friedrichshafen (DE); Peter Ziemer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/607,451

(22) PCT Filed: Mar. 26, 2018

(86) PCT No.: PCT/EP2018/057563
§ 371 (c)(1),
(2) Date: Oct. 23, 2019

(87) PCT Pub. No.: WO2018/197125
PCT Pub. Date: Nov. 1, 2018

(65) Prior Publication Data
US 2020/0132172 A1 Apr. 30, 2020

(30) Foreign Application Priority Data
Apr. 24, 2017 (DE) ...................... 10 2017 206 816.7

(51) Int. Cl.
*F16H 3/66* (2006.01)
*F16H 3/62* (2006.01)

(52) U.S. Cl.
CPC ........ *F16H 3/62* (2013.01); *F16H 2200/0073* (2013.01); *F16H 2200/0086* (2013.01);
(Continued)

(58) Field of Classification Search
CPC ................ F16H 2200/2012–2200/2017; F16H 2200/2046–2200/2061; F16H 2200/0073–0078; B60K 2006/4825
See application file for complete search history.

(56) References Cited

U.S. PATENT DOCUMENTS 5,478,291 A * 12/1995 Morisawa ................ F16H 3/66
475/144
6,960,149 B2 11/2005 Ziemer
(Continued)

FOREIGN PATENT DOCUMENTS

DE 101 15 995 A1 10/2002
DE 10 2008 032 469 A1 1/2009
(Continued)

OTHER PUBLICATIONS

Thomas Belz: "Varianten von Mehrgang-Planetengetrieben", Mar. 8, 2016 See International Search (to Follow).
(Continued)

*Primary Examiner* — David R Morris
*Assistant Examiner* — Lillian T Nguyen
(74) *Attorney, Agent, or Firm* — Davis & Bujold PLLC; Michael J. Bujold

(57) ABSTRACT

A transmission (G) for a motor vehicle. The transmission (G) has a drive shaft (GW1), an output shaft (GW2-A), first, second, third and fourth planetary gearsets (P1, P2, P3, P4) and first, second, third, fourth, fifth and sixth shift elements (B1, K1, K2, B2, K3, K4). Selective actuation of the six shift elements (B1, K1, K2, B2, K3, K4) implements eleven forward gears and two reverse gears between the drive shaft
(Continued)

(GW1) and the output shaft (GW2-A). A drive train for a motor vehicle having such a transmission (G) is also disclosed.

15 Claims, 7 Drawing Sheets

(52) U.S. Cl.
CPC ............... *F16H 2200/2012* (2013.01); *F16H 2200/2046* (2013.01); *F16H 2200/2094* (2013.01)

(56) References Cited

U.S. PATENT DOCUMENTS

| | | | |
|---|---|---|---|
| 8,016,713 | B2 | 9/2011 | Phillips et al. |
| 8,545,362 | B1 | 10/2013 | Goleski et al. |
| 9,163,705 | B1 | 10/2015 | Hwang et al. |
| 9,506,533 | B2 | 11/2016 | Park et al. |
| 9,822,856 | B2 | 11/2017 | Hoffman |
| 2010/0069191 | A1 | 3/2010 | Swales et al. |
| 2012/0083381 | A1* | 4/2012 | Wittkopp ............... F16H 3/663 475/275 |
| 2015/0267782 | A1* | 9/2015 | Beck ..................... F16H 3/66 475/278 |
| 2015/0369341 | A1* | 12/2015 | Beck ..................... F16H 3/66 475/277 |
| 2016/0169342 | A1* | 6/2016 | Cho ...................... F16H 3/66 475/277 |
| 2016/0186837 | A1* | 6/2016 | Beck ..................... F16H 3/66 475/277 |
| 2017/0009848 | A1* | 1/2017 | Ji ......................... F16H 3/666 |
| 2018/0073606 | A1* | 3/2018 | Kook .................... F16H 3/66 |
| 2019/0291564 | A1* | 9/2019 | Warth ................... F16H 19/04 |

FOREIGN PATENT DOCUMENTS

| | | |
|---|---|---|
| DE | 10 2010 007 613 A1 | 11/2010 |
| DE | 10 2014 214 212 A1 | 1/2015 |
| DE | 10 2014 108 826 A1 | 12/2015 |
| DE | 10 2014 117 679 A1 | 3/2016 |
| JP | 2015-194196 A | 11/2015 |
| JP | 2015-197207 A | 11/2015 |
| KR | 10-2016-0072696 A | 6/2016 |

OTHER PUBLICATIONS

German Search Report Corresponding to 10 2017 206 836.1 dated Nov. 23, 2017.
German Search Report Corresponding to 10 2017 206 803.5 dated Nov. 23, 2017.
German Search Report Corresponding to 10 2017 206 816.7 dated Nov. 23, 2017.
International Search Report Corresponding to PCT/EP2018/057564 dated Jul. 9, 2018.
International Search Report Corresponding to PCT/EP2018/057565 dated Jul. 16, 2018.
International Search Report Corresponding to PCT/EP2018/057563 dated Jul. 10, 2018.
Written Opinion Corresponding to to PCT/EP2018/057564 dated Jul. 9, 2018.
Written Opinion Corresponding to PCT/EP2018/057565 dated Jul. 16, 2018.
Written Opinion Corresponding to PCT/EP2018/057563 dated Jul. 10, 2018.

\* cited by examiner

| Gear | B1 | K1 | K2 | B2 | K3 | K4 |
|------|----|----|----|----|----|----|
| 1    |    | x  |    | x  |    | x  |
| 2    | x  | x  |    | x  |    |    |
| 3    | x  |    |    | x  |    | x  |
| 4    | x  |    |    | x  | x  | x  |
| 5    |    |    |    | x  | x  | x  |
| 6    | x  |    |    |    | x  | x  |
| 7.1  |    | x  | x  |    |    |    |
| 7.2  |    | x  | x  |    | x  | x  |
| 7.3  |    | x  | x  |    |    |    |
| 7.4  |    |    | x  |    | x  |    |
| 8    | x  | x  |    |    | x  | x  |
| 9    | x  |    | x  |    | x  |    |
| 10   | x  | x  | x  |    |    | x  |
| 11   | x  |    | x  |    |    |    |
| R1   |    | x  | x  | x  |    |    |
| R2   |    |    | x  | x  |    | x  |

Fig. 7

TRANSMISSION FOR A MOTOR VEHICLE

This application is a National Stage completion of PCT/EP2018/057563 filed Mar. 26, 2018, which claims priority from German patent application serial no. 10 2017 206 816.7 filed Apr. 24, 2017.

FIELD OF THE INVENTION

The invention relates to a transmission for a motor vehicle, comprising a drive shaft and an output shaft, and a first, a second, a third and a fourth planetary gearset, wherein the planetary gearsets each comprise a plurality of elements, wherein a first, a second, a third, a fourth, a fifth and a sixth shift element are provided, the selective actuation of which establishes different paths of the flow of power through the planetary gearsets to achieving different gears between drive shaft and output shaft.

BACKGROUND OF THE INVENTION

In this case, a transmission refers to a multi-speed transmission, i.e. there are several different gear ratios that can be achieved as gears between the drive shaft and the output shaft of the transmission by actuating corresponding shift elements, which is preferably done automatically. Depending on the arrangement of the shift elements, they are clutches or brakes. Such transmissions are mainly used in motor vehicles to suitably convert a traction force supply of a prime mover of the motor vehicle in respect to various criteria.

U.S. Pat. No. 8,545,362 B1 discloses a transmission which comprises four planetary gearsets, which each comprise a plurality of elements in the form of one sun gear, one planetary carrier and one ring gear each. In addition, six shift elements are provided, through the selective actuation of which different gears can be established between a drive shaft and an output shaft of the transmission. Overall, ten forward gears and one reverse gear can be achieved between the drive shaft and the output shaft.

SUMMARY OF THE INVENTION

The problem addressed by this invention is providing an alternative embodiment to the transmission known from the prior art having at least ten forward gears and at least one reverse gear.

This problem is solved based on the preamble of the independent claim(s) in conjunction with its characterizing features. The subsequent dependent claims each describe advantageous developments of the invention. A drive train of a motor vehicle, in which a transmission according to the invention is used, is the subject matter of the independent claim(s).

According to the invention, a transmission comprises a drive shaft and an output shaft, and a first, a second, a third and a fourth planetary gearset. The planetary gearsets each comprise a plurality of elements and are used to route a flow of power from the drive shaft to the output shaft. Further, six shift elements are provided, wherein by their selective actuation different routes of the flow of power can be established using the planetary gearsets for achieving different gears between drive shaft and output shaft.

In the context of the invention, "shaft" denotes a rotatable component of the transmission, which is used to interconnect assigned components of the transmission axially and/or radially rotationally fixed to each other or which is used to establish such a connection upon actuation of a suitable shift element. Thus, the relevant shaft can also be an interface, which is used to connect a component, for instance, radially.

In the context of the invention, "axial" denotes an orientation in the direction of an axis, along which the planetary gearsets are arranged coaxially to each other. The term "radial" then denotes an orientation in the diameter direction of a shaft in line with the axis.

The planetary gearsets are preferably arranged in the axial direction in the order of the first planetary gearset, the second planetary gearset, the third planetary gearset, and the fourth planetary gearset. In principle, however, another arrangement could also be made within the scope of the invention.

The invention now comprises the technical teaching that the first element of the first planetary gearset can be fixed to a non-rotating component via the first shift element, whereas the second element of the first planetary gearset is rotationally fixed to the drive shaft and can, by means of the second shift element, be rotationally fixed to the second element of the second planetary gearset and the first element of the third planetary gearset, which are rotationally fixed to each other. Furthermore, the third element of the first planetary gearset is rotationally fixed to the first element of the fourth planetary gearset and together with this can be rotationally fixed, via the third shift element, to the second element of the third planetary gearset, which can also be fixed to the non-rotating component by means of the fourth shift element. The third element of the third planetary gearset and the third element of the fourth planetary gearset are rotationally fixed to each other, whereas the second element of the fourth planetary gearset is rotationally fixed to the output shaft.

In addition, the third planetary gearset can be blocked via the fifth shift element, whereas in the second planetary gearset there is a first coupling of the first element of the second planetary gearset with the third element of the first planetary gearset and the first element of the fourth planetary gearset, and a second coupling of the third element of the second planetary gearset with the first element of the first planetary gearset. One coupling of these two couplings is a permanently rotationally fixed connection, whereas for the remaining coupling a rotationally fixed connection can be established by means of the sixth shift element.

In other words, in the transmission according to the invention, therefore, the drive shaft is permanently rotationally fixed to the second element of the first planetary gearset, whereas the third element of the first planetary gearset is constantly rotationally fixed to the first element of the fourth planetary gearset. Likewise, the third element of the third planetary gearset and the third element of the fourth planetary gearset are also permanently rotationally fixed to each other, wherein in the third planetary gearset, the first element of the third planetary gearset is also permanently rotationally fixed to the second element of the second planetary gearset. Furthermore, the second element of the fourth planetary gearset is rotationally fixed to the drive shaft.

Upon actuation of the first shift element, the first element of the first planetary gearset is fixed to the non-rotating component, whereas closing the second shift element results in a rotationally fixed connection of the second element of the first planetary gearset to the second element of the second planetary gearset and the first element of the third planetary gearset. In this case, the second element of the second planetary gearset and the first element of the third planetary gearset are also rotationally fixed to the drive shaft. By actuating the third shift element, the first element of the fourth planetary gearset and the third element of the third planetary gearset are jointly rotationally fixed to the second element of the third planetary gearset, which can also be fixed to the non-rotating component by closing the fourth shift element. On the other hand, closing the fifth shift element results in blocking the third planetary gearset.

For the second planetary gearset, there are two couplings of the elements of the second planetary gearset in the transmission according to the invention. Thus, there is a first coupling in the form of the first element of the second planetary gearset with the third element of the first planetary gearset and the first element of the fourth planetary gearset, whereas in the case of the third element of the second planetary gearset there is a second coupling to the first element of the first planetary gearset. One of the two aforementioned couplings, i.e. either the first coupling or the second coupling, is implemented as a permanently rotationally fixed connection, whereas the other coupling, i.e. either the second coupling or the first coupling is a connection that only becomes rotationally fixed by closing the sixth shift element.

In the context of the invention, a "coupling" denotes a connection, which is either a permanently rotationally fixed connection or is established in a rotationally fixed manner by actuating a relevant shift element.

The non-rotating element of the transmission according to the invention is a permanently stationary component of the transmission, preferably a transmission housing, a part of such a transmission housing or a component, which is permanently connected to the transmission housing. The first element of the first planetary gearset is fixed to this non-rotating component upon actuation of the first shift element and thus prevented from rotating. Likewise, the second element of the third planetary gearset can be stopped by closing the fourth shift element and the associated blocking at the non-rotating component. It does not have to be the same non-rotating component, but any one of the non-rotating components.

In the transmission according to the invention, the first and the fourth shift elements are designed as brakes that brake the rotatable component or the rotatably engaged, rotatable components of the transmission to a standstill and fix them to the non-rotating component. Once again, the fourth, the fifth and the sixth shifting elements are clutches, which, when actuated, assimilate the rotational motions of the respective associated rotating components of the transmission and subsequently connect them in a rotationally fixed manner.

Preferably, the first shift element is provided axially on a side of the first planetary gearset facing a connection point of the drive shaft, and radially surrounding it, whereas the second shift element lies axially in particular between the first planetary gearset and the second planetary gearset. Furthermore, the third shift element and the fifth shift element are preferably provided axially between the third planetary gearset and the fourth planetary gearset and are further preferably axially directly adjacent to each other, and located radially basically at the same height. Due to this spatial arrangement, a common supply of the third shift element and the fifth shift element via a common supply line is conceivable.

The fourth shift element is provided axially in particular between the second planetary gearset and the third planetary gearset and arranged radially surrounding them. Depending on the coupling to be produced, the sixth shift element can either be located in the gear plane of the second planetary gearset and is then provided axially basically at the level of the second planetary gearset and radially surrounding it, or the sixth shift element is likewise placed axially between the first planetary gearset and the second planetary gearset. In the latter case, the sixth shift element is then preferably arranged axially between the first planetary gearset and the second shift element and is placed radially inward of the second shift element. In this case, a common supply of the second and the sixth shift element can be implemented using a common supply line.

A rotationally fixed connection of the rotatable elements of the planetary gearsets according to the invention is preferably implemented by one or more intermediate shafts, which can be short axial and/or radial intermediate elements in case of a compact design of the elements. Specifically, the permanently rotationally engaged elements of the planetary gearsets can each be either individual components that are rotationally fixed to each other or integral pieces. In the second case, the respective elements and the optionally existing shaft are then formed by a joint component, wherein this is implemented in particular if the respective elements in the transmission are in close proximity to each other.

For elements of the planetary gearsets, which are only rotationally fixed to each other upon the actuation of respective shift elements, a connection via one or more intermediate shafts is implemented as well. Overall, a transmission in accordance with the invention is characterized by a compact design, low component loads, good gearing efficiency and low transmission losses.

According to one embodiment of the invention, the first element of the second planetary gearset is rotationally fixed to the third element of the first planetary gearset and to the first element of the fourth planetary gearset, whereas the third element of the second planetary gearset can be rotationally fixed to the first element of the first planetary gearset by means of the sixth shift element.

In this case, then, the first element of the second planetary gearset is permanently rotationally fixed to the third element of the first planetary gearset and to the first element of the fourth planetary gearset, whereas the third element of the second planetary gearset is rotationally fixed to the first element of the first planetary gearset after the sixth shift element has been actuated. In this case, the sixth shift element is preferably in the gear plane of the second planetary gearset.

According to an alternative embodiment of the invention, the third element of the second planetary gearset is rotationally fixed to the first element of the first planetary gearset, whereas the first element of the second planetary gearset can be rotationally fixed to the third element of the first planetary gearset and the first element of the fourth planetary gearset by means of the sixth shift element.

In this variant, therefore, the third element of the second planetary gearset is permanently rotationally fixed to the first element of the first planetary gearset, whereas in the case of the first element of the second planetary gearset, a rotationally fixed connection to the third element of the first planetary gearset and the first element of the fourth planetary gearset is established only when the sixth shift element is closed. As described above, the sixth shift element is preferably located axially between the first planetary gearset and the second planetary gearset and is further preferably provided axially between the first planetary gearset and the second shift element.

In a further development of the invention, the fifth shift element locks upon actuation the third planetary gearset by a rotatably engaged connection of the first element and the second element of the third planetary gearset. Alternatively, the third shift element is locked by the fifth shift element in the closed state connecting the second element and the third element of the third planetary gearset with each other in a rotationally fixed manner. In both cases, the result is the third planetary gearset being locked.

In all the above variants of a transmission according to the invention, eleven forward gears, and two reverse gears can be implemented by selectively closing three shift elements each. To this end, a first forward gear is achieved by actuating the second, the fourth and the sixth shift elements, whereas a second forward gear is formed by closing the first, the second and the fourth shift elements. Further, a third forward gear is obtained by actuating the first, fourth and sixth shift elements, whereas a fourth forward gear can be achieved by actuating the first, fourth and fifth shift elements. Further, a fifth forward gear can be established by closing the fourth, the fifth and the sixth shift elements, wherein for achieving a sixth forward gear, the first, the fifth and the sixth shift elements have to be actuated.

By contrast, a seventh forward gear in a first variant results from actuating the second, the fifth and the sixth shift elements or, alternatively, in a second variant by closing the second, the third and the sixth shift elements. Furthermore, a seventh forward gear in a third variant can be achieved by actuating the second, the third and the fifth shift elements, and in a fourth variant by closing the third, the fifth and the sixth shift elements. An eighth forward gear can be achieved by actuating the first, second and fifth shift elements, whereas a ninth forward gear can be achieved by actuating the first, third and fifth shift elements. To achieve a tenth forward gear, the first, the second and the third shift elements have to be closed, whereas an eleventh forward gear results upon actuation of the first, the third and the sixth shift elements.

In contrast, a first reverse gear is achieved by actuating the second, the third and the fourth shift elements, whereas a second reverse gear is achieved upon closing the third, the fourth and the sixth shift elements.

With a suitable choice of stationary gear ratios of the planetary gearsets, a suitable gear ratio range is implemented for the application in the automotive sector. For a sequential achieving of the forward gears according to their order, except for the second, the third and the fourth variants of the seventh forward gear, the state of two shift elements each always has to be varied by opening one of the shift elements involved in the previous forward gear and closing another shift element to establish the subsequent forward gear. This then has the consequence that a change between the gears can be executed very quickly.

Advantageously, in the transmission according to the invention, two reverse gears for a drive can be implemented via the prime mover upstream of the transmission. This can be implemented as an alternative or in addition to an arrangement of an electric machine in the transmission to still be able to implement reverse driving of the motor vehicle in the event of a failure of the electric machine.

According to a further embodiment of the invention, an individual planetary gearset can be a minus planetary gearset, wherein the first element of the planetary gearset is a sun gear, the second element of the planetary gearset is a planetary carrier and the third element of the planetary gearset is a ring gear. A minus planetary gearset is composed of the elements sun gear, planetary carrier and ring gear in a manner known in principle to the person skilled in the art, wherein the planetary carrier supports at least one, but preferably a plurality of planet gears, which individually each mesh with both the sun gear and the surrounding ring gear. Of the four planetary gearsets then one or more planetary gearsets are designed as such minus planetary gearsets. Particularly preferably, however, all planetary gearsets are available as minus planetary gearsets; in that way a compact design can be implemented.

Alternatively or in addition, an individual planetary gearset can be a plus planetary gearset, wherein the first element of the planetary gearset is a sun gear, the second element of the planetary gearset is a planetary carrier and the third element of the planetary gearset is a ring gear. In a plus planetary gearset the elements sun gear, ring gear and planetary carrier are also present, wherein the latter supports at least one pair of planet gears, in which one planet gear meshes with the inner sun gear and the other planet gear meshes with the surrounding ring gear, and the planet gears mesh with each other. In the transmission according to the invention, one or more planetary gearsets may be designed as such plus planetary gearsets.

A connection of the individual elements permitting, a minus planetary gearset can be changed into a plus planetary gearset, wherein in comparison to the version as a minus planetary gearset, the connection of the ring gear and the planetary carrier has to be interchanged and a relevant stationary gear ratio has to be increased by one. Conversely, a plus planetary gearset could be replaced by a minus planetary gearset, the connection of the elements of the transmission permitting. In this case, compared to the plus planetary gearset, the ring gear and the planetary carrier connection would then also have to be interchanged and a relevant stationary gear ratio has to be decreased by one. As mentioned above, however, all planetary gearsets are preferably minus planetary gearsets.

In a further development of the invention, one or more shift elements are each implemented as non-positive shift elements. Non-positive shift elements have the advantage of being able to be achieved under load, i.e. a change of gears can be executed without interruption of traction. But particularly preferably, the fourth shift element is designed as a form-locking shift element, such as a dog clutch or a synchronizer unit. Because the fourth shift element is involved in establishing the first to fifth forward gears, i.e. in this case, only one opening occurs in the course of successive upshifting. A form-fitting shift element has the advantage over a non-positive shift element that only slight drag torques occur in the opened state, i.e. a higher efficiency can be attained.

According to a further embodiment of the invention, the drive shaft and the output shaft are coaxial to each other and each form a connection point, wherein the connection point of the drive shaft and the connection point of the output shaft are at opposite axial ends. This type of arrangement is particularly suitable for use in a motor vehicle having a drive train aligned in the direction of travel of the motor vehicle. Alternatively, the connection point of the output shaft can also be aligned transversely to the connection point of the drive shaft to implement a setup suitable for a drive train that is transversely oriented to the direction of travel of the motor vehicle. In this case, the connection point of the output shaft may be formed by a toothing, which meshes with a toothing of a shaft arranged in parallel to the axis of the drive shaft. The rear or front differential of a drive axle can then be arranged on this shaft.

In a further development of the invention, an electric machine is provided, the rotor of which is rotationally fixed to one of the rotatable components of the transmission. Preferably, a stator of the electric machine is then rotationally fixed to the non-rotating component of the transmission. In addition, the electric machine can be operated in particular as an electric motor and/or a generator to implement different functions. In particular, the electric machine can be used to perform in purely electric drive mode, as a power booster via the electric machine, in deceleration and recuperation mode and/or for synchronization in the transmission. The rotor of the electric machine can be arranged coaxially to the relevant component or can be arranged offset in the axial direction, wherein in the latter case a coupling can be implemented via one or more intermediate transmission stages, for instance in the form of spur gears, or a belt drive, such as a chain drive.

Preferably, however, the rotor of the electric machine is rotationally fixed to the drive shaft, thereby establishing a pure electric driving mode of the motor vehicle in a suitable manner. More preferably, one or more of the shift elements are used as internal driving-off elements for electric driving. For this purpose, in particular, the second shift element, the fourth shift element or the sixth shift element are suitable because they are closed in both the reverse gear and in the first forward gear. As a further alternative, however, a separate starting clutch can be used, which is positioned between the electric machine and the transmission gearset.

In pure electric driving mode, one of the gears is achieved in the transmission, wherein in the forward gears a reverse drive of the motor vehicle can be implemented by the electric machine initiating a reverse rotary motion, thereby the reverse travel of the motor vehicle is performed in the gear ratio of the achieved forward gear. As a result, the gear ratios of the forward gears can be used for both the electric forward travel and the electric reverse travel. The rotor of the electric machine could, however, apart from the drive shaft, also be connected to one of the other, rotatable components of the transmission.

According to a further embodiment of the invention, which is implemented in particular in combination with the aforementioned arrangement of an electric machine, a clutch is also provided, which can be used to rotatably engage the drive shaft with a connecting shaft. The connecting shaft is then used to connect to the prime mover as part of a drive train of a motor vehicle. The provision of the clutch has the advantage that for pure electric driving mode, a connection to the prime mover can be interrupted, to prevent it from being entrained. The clutch is preferably designed as a non-positive shift element, such as a multi-disk clutch, but may also be a positive shift element, such as a dog clutch or synchronizer unit.

In general, a starting element can be installed upstream of the transmission, for instance a hydrodynamic torque converter or a friction clutch. This starting element can then also be part of the transmission and is used to design a starting process by permitting a slip speed between the internal combustion engine and the drive shaft of the transmission. In this case, one of the shift elements of the transmission or the possibly existing clutch can be designed as such a starting element in the form of a friction shift element. In addition, in principle a freewheel to the transmission housing or to another shaft can be arranged on every shaft of the transmission.

The transmission according to the invention is in particular part of a drive train of a motor vehicle and is then arranged between a prime mover of the motor vehicle designed in particular as an internal combustion engine and further components of the drive train arranged downstream in the direction of flow of power to the drive wheels of the motor vehicle. In that case, the drive shaft of the transmission is either permanently rotationally fixed to a crankshaft of the internal combustion engine or can be connected to the latter via an intermediate clutch or a driving-off element, wherein a torsional vibration damper can also be provided between the internal combustion engine and the transmission. On the output end, the transmission within the drive train of a motor vehicle is then preferably coupled to an axle drive of an axle drive of the motor vehicle, although there may also be a connection to a longitudinal differential, which can be used for a distribution to a plurality of driven axles of the motor vehicle. The axle drive or the longitudinal differential can be arranged together with the transmission in a joint housing. Likewise, a torsional vibration damper can also be integrated into this housing.

The fact that two components of the transmission are "rotationally fixed to each other" or "coupled" or "interconnected" denotes in terms of the invention a permanent connection of these components, i.e. they cannot rotate independently of each other. In this respect, no shift element is provided between these components, which may be elements of the planetary gearsets or shafts or a non-rotating component of the transmission, but the corresponding components are rigidly coupled to each other.

However, if a shift element is provided between two components of the transmission, then these components are not permanently rotationally fixed to each other, but a coupling for co-rotation is performed only by actuating the intermediate shift element. In this case, an actuation of the shift element in the sense of the invention means that the relevant shift element is transferred to a closed state and, as a consequence, aligns the rotary motions of components directly coupled thereto. In the case of an embodiment of the relevant shift element as a form-locking shift element, the directly rotationally engaged components are running at the same speed, whereas in the case of a non-positive shift element, speed differences between the components can exist even after it has been actuated. This intentional or unwanted state is still referred to as a rotatably engaged connection of the respective components via the shift element in the context of the invention.

The invention is not limited to the specified combination of the features of the main claim or the dependent claims. There are also options to combine individual features, even if they arise from the claims, from the following description of preferred embodiments of the invention or directly from the drawings. Any references in the claims to the drawings by use of reference numerals are not intended to limit the scope of the claims.

BRIEF DESCRIPTION OF THE DRAWINGS

Advantageous embodiments of the invention, which are explained below, are shown in the drawings. In the drawings:

FIG. 7 shows an exemplary circuit diagram of the transmission of FIGS. 2 to 6.

DETAILED DESCRIPTION OF THE PREFERRED EMBODIMENTS

Figure 1:
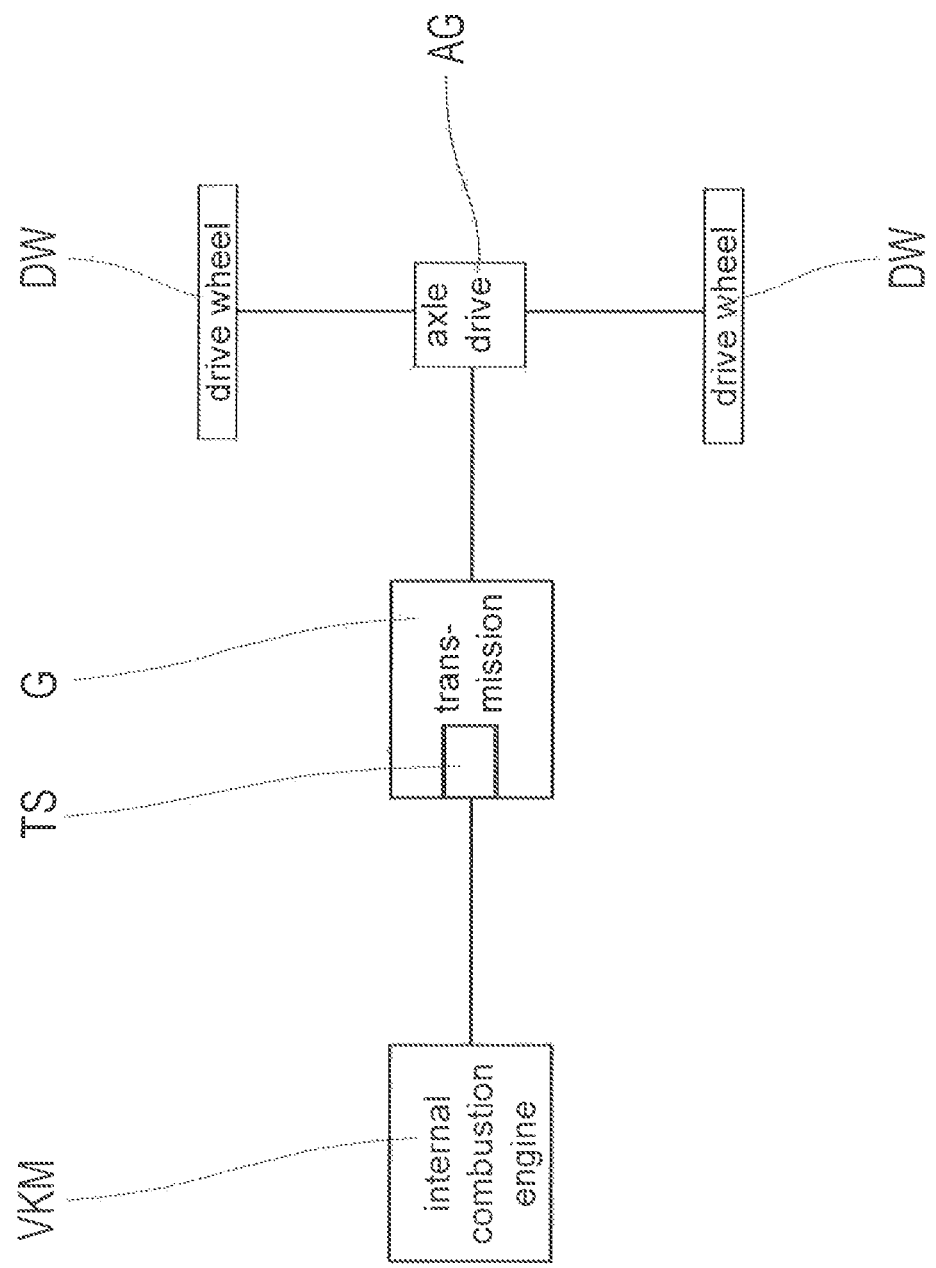
FIG. 1 shows a schematic view of a drive train of a motor vehicle, in which a transmission according to the invention is used.

FIG. 1 shows a schematic view of a drive train of a motor vehicle in which an internal combustion engine VKM is connected to a transmission G via an intermediate torsional vibration damper TS. On the output end, downstream of the transmission G is an axle drive AG which distributes drive power to drive wheels DW of a drive axle of the motor vehicle. The transmission G and the axle drive AG can be combined in a common transmission housing, in which then the torsional vibration damper TS can be integrated as well. As can also be seen in FIG. 1, the internal combustion engine VKM, the torsional vibration damper TS, the transmission G and the axle drive AG are oriented in the direction of travel of the motor vehicle.

Figure 2:
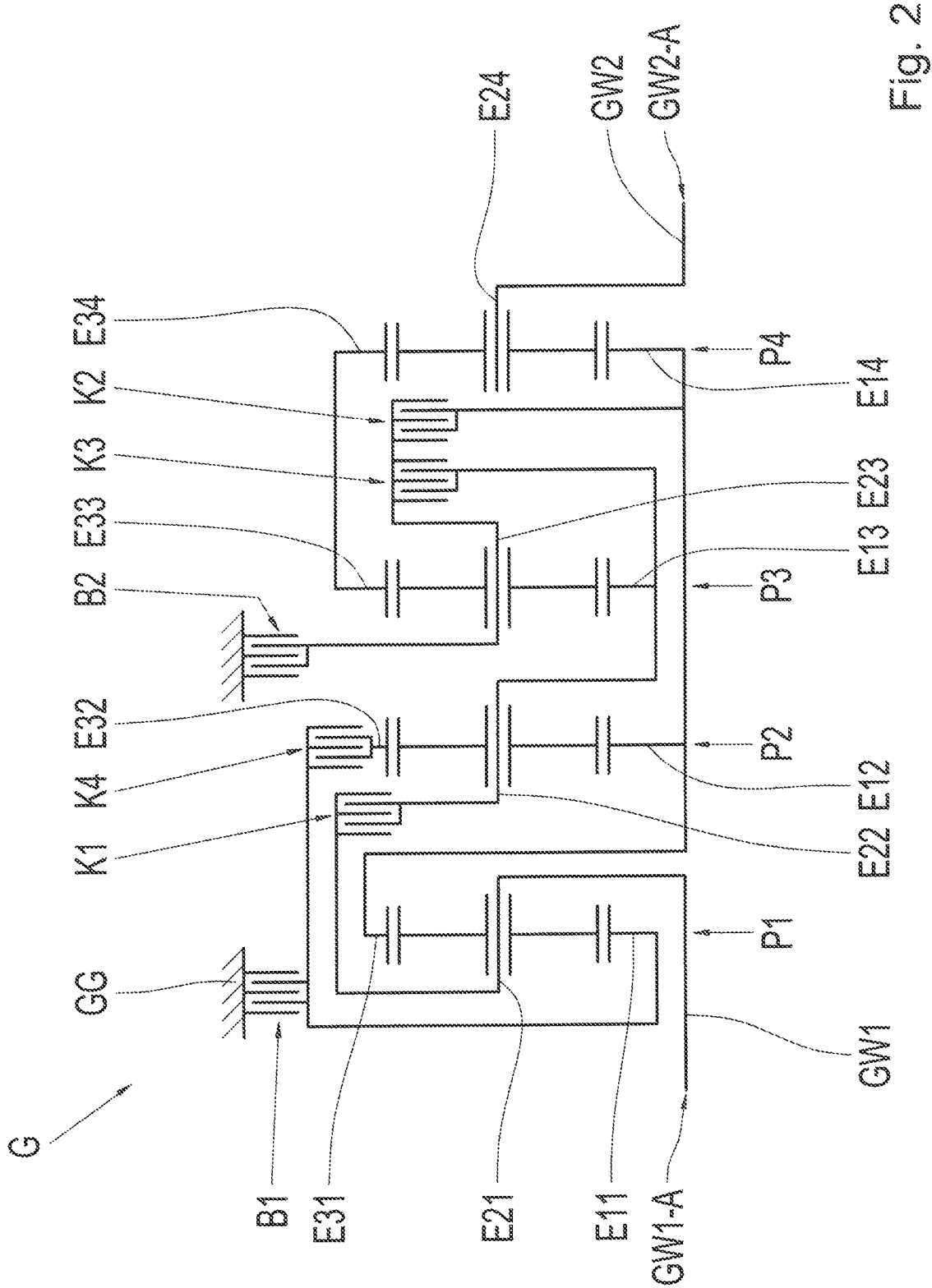
FIG. 2 shows a schematic view of a transmission according to a first embodiment of the invention.

FIG. 2 shows a schematic representation of the transmission G according to a first embodiment of the invention. As can be seen, the transmission G comprises a first planetary gearset P1, a second planetary gearset P2, a third planetary gearset P3 and a fourth planetary gearset P4. Each of the planetary gearsets P1, P2, P3 and P4 has a first element E11, E12, E13 or E14, respectively, a second element E21, E22, E23 or E24, respectively, and a third element E31, E32, E33 or E34, respectively. The first element E11, E12, E13 or E14 is always formed by a sun gear of the respective planetary gearset P1, P2, P3 or P4, whereas the respective second element E21, E22, E23 or E24 is a planetary carrier in the planetary gearsets P1, P2, P3 and P4. The remaining third element E31, E32, E33 or E34 is then formed by a ring gear of the respective planetary gearset P1, P2, P3 or P4.

The planetary gearsets P1, P2, P3 and P4 are thus each designed as minus planetary gearsets, in which one, or preferably several planet gears are rotatably mounted on the planetary carrier and which mesh with the radially inner sun gear and also with the surrounding ring gear.

The connection permitting, one or more of the planetary gearsets P1, P2, P3 and P4 could be executed as plus planetary gearsets. In a plus planetary gearset, the planetary carrier then bears at least one pair of planetary gears, and of those planetary gears, one planetary gearset meshes with the radially inner sun gear and one planetary gearset meshes with the radially surrounding ring gear, and the planetary gears of the pair of planetary gears mesh with each other. Compared to an embodiment as a minus planetary gearset, the second element E21, E22, E23 or E24 would then have to be formed by the ring gear and the third element E31, E32, E33 or E34 would then have to be formed by the planetary carrier for the change into a plus planetary gearset and a relevant stationary gear ratio would have to be increased by one.

In this case, the first planetary gearset P1, the second planetary gearset P2, the third planetary gearset P3 and the fourth planetary gearset P4 are arranged axially between first connection point GW1-A of a drive shaft GW1-A and a second connection point GW2-A of an output shaft GW2 in the order first planetary gearset P1, second planetary gearset P2, third planetary gearset P3 and fourth planetary gearset P4.

The connection point GW1-A and the connection point GW2-A are provided coaxially to each other at opposite axial ends of the transmission G. To this end, the connection point GW1-A is used in the drive train of a motor vehicle of FIG. 1 as a connection to the internal combustion engine VKM, whereas the transmission G is connected to the downstream axle drive AG at the connection point GW2-A.

As can be seen in FIG. 2, the transmission G comprises a total of six shift elements in the form of a first shift element B1, a second shift element K1, a third shift element K2, a fourth shift element B2, a fifth shift element K3 and a sixth shift element K4. In this case, the shift elements B1, K1, K2, B2, K3 and K4 are each designed as non-positive shift elements and are preferably multi-disk shift elements. In addition, the second shift element K1, the third shift element K2, the fifth shift element K3 and the sixth shift element K4 are designed as clutches in this case, whereas the first shift element B1 and the fourth shift element B2 are brakes.

In this case, the first shift element B1 can be used to block the first element E11 of the first planetary gearset P1 at a non-rotating component GG, which is preferably a transmission housing of the transmission G or is part of such a transmission housing. Apart from this blocking, the first element E11 of the first planetary gearset B1 can also be rotationally fixed to the third element E32 of the second planetary gearset P2 by means of the sixth shift element K4.

The second element E21 of the first planetary gearset P1 is rotationally fixed to the drive shaft GW1. Furthermore, the second shift element K1 can be used to rotationally fix the second element E21 of the first planetary gearset P1 to the second element E22 of the second planetary gearset P2 and with the first element E13 of the third planetary gearset P3, which are permanently rotationally fixed to each other. The engagement of the second shift element K1 then also results in a rotationally fixed connection of the second element E22 of the second planetary gearset P2 and of the first element E13 of the third planetary gearset P3 to the drive shaft GW1.

As can also be seen in FIG. 2, the third element E31 of the first planetary gearset P1 is permanently rotationally fixed to the first element E12 of the second planetary gearset P2 and the first element E14 of the fourth planetary gearset P4 and the third shift element K2 can be used to rotationally fixed them to the second element E23 of the third planetary gearset P3. The second element E23 of the third planetary gearset P3 can also be fixed, via engagement of the fourth shift element B2, to the non-rotating component GG, and rotationally fixed to the first element E13 of the third planetary gearset P3 and the second element E22 of the second planetary gearset P2 via the fifth shift element K3, wherein the rotationally fixed connection of the second element E23 of the third planetary gearset P3 with the first element E13 of the third planetary gearset P3 results in locking the third planetary gearset P3.

Furthermore, the third element E33 of the third planetary gearset P3 and the third element E34 of the fourth planetary gearset P4 are permanently rotationally fixed to each other, whereas the second element E24 of the fourth planetary gearset P4 is rotationally fixed to the output shaft GW2.

The first shift element B1 is located axially at an end of the first planetary gearset P1 facing the connection point GW1-A of the drive shaft GW1 and is provided radially surrounding the former. In contrast, the second shift element K1 is arranged axially between the first planetary gearset P1 and the second planetary gearset P2, wherein the sixth shift element K4 is placed axially adjacent to the second shift element K1, and is axially provided in the gear plane of the second planetary gearset P2 and thus basically at the same axial level of the second planetary gearset P2. Due to the spatial arrangement of the second shift element K1 and the sixth shift element K4, a common supply of the two shift elements can be implemented using one supply line.

As can also be seen in FIG. 2, the third shift element K2 and the fifth shift element K3 are arranged axially between the third planetary gearset P3 and the fourth planetary gearset P4 and are axially directly adjacent to each other, as well as radially basically at the same height. In this respect, a common supply of the third shift element K2 and the fifth shift element K3 can be implemented here as well. Finally, the fourth shift element B2 is axially placed between the second planetary gearset P2 and the third planetary gearset P3 and arranged radially surrounding them.

Figure 3:
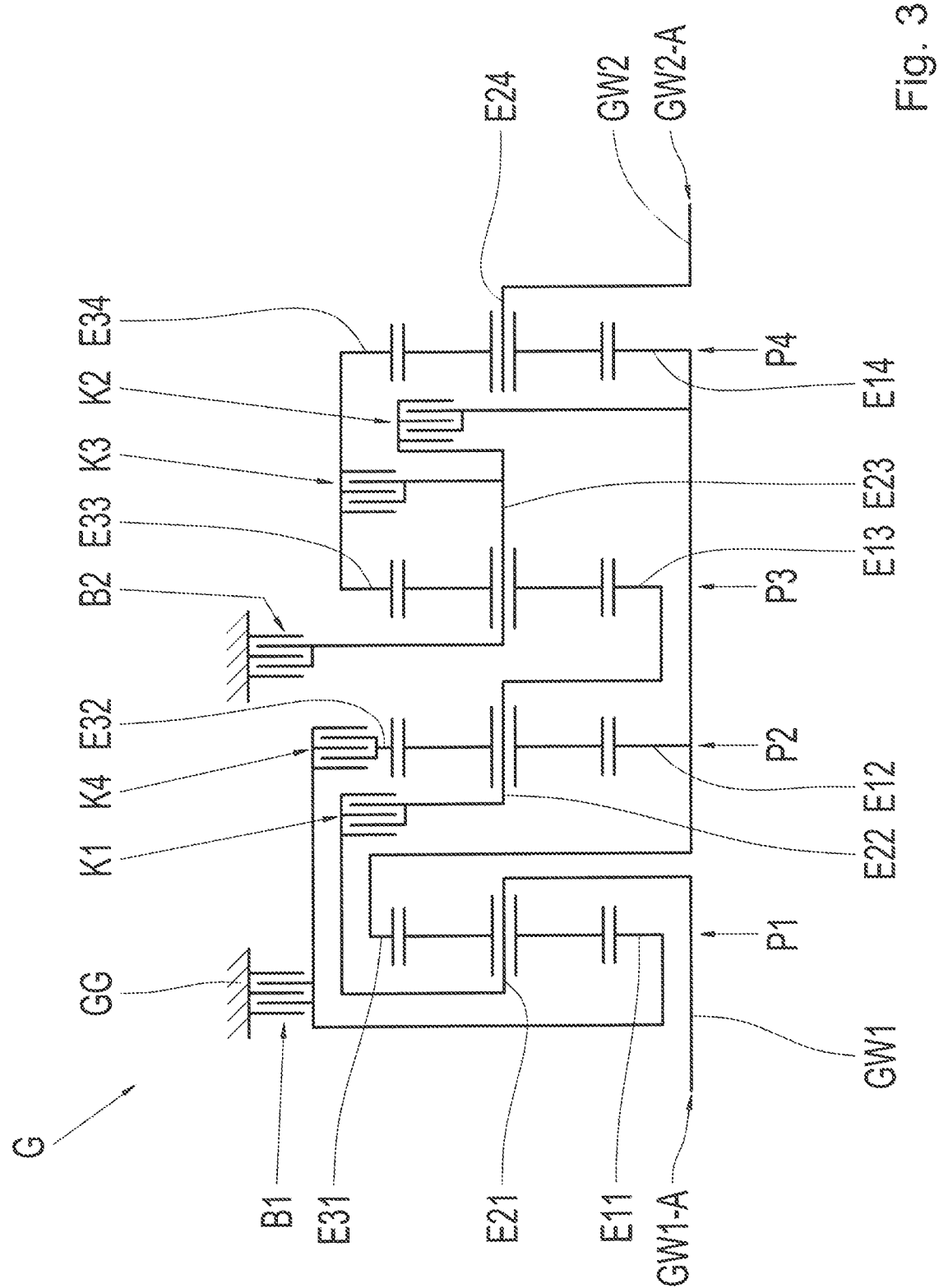
FIG. 3 shows a schematic representation of a transmission according to a second embodiment option of the invention.

In addition, FIG. 3 shows a schematic representation of a transmission G according to a second embodiment of the invention, which largely corresponds to the variant according to FIG. 2. The only difference is that the fifth shift element K3 when engaged now rotationally fixes the second element E23 and the third element E33 of the third planetary gearset P3 to each other and in that way causes the third planetary gearset P3 to be locked. Due to the altered function of the fifth shift element K3, it is now located radially further outward in comparison to the third shift element K2, which is axially located directly adjacent. Otherwise, the embodiment according to FIG. 3 corresponds to the preceding variant of FIG. 2, i.e. reference is made to the description thereof.

Figure 4:
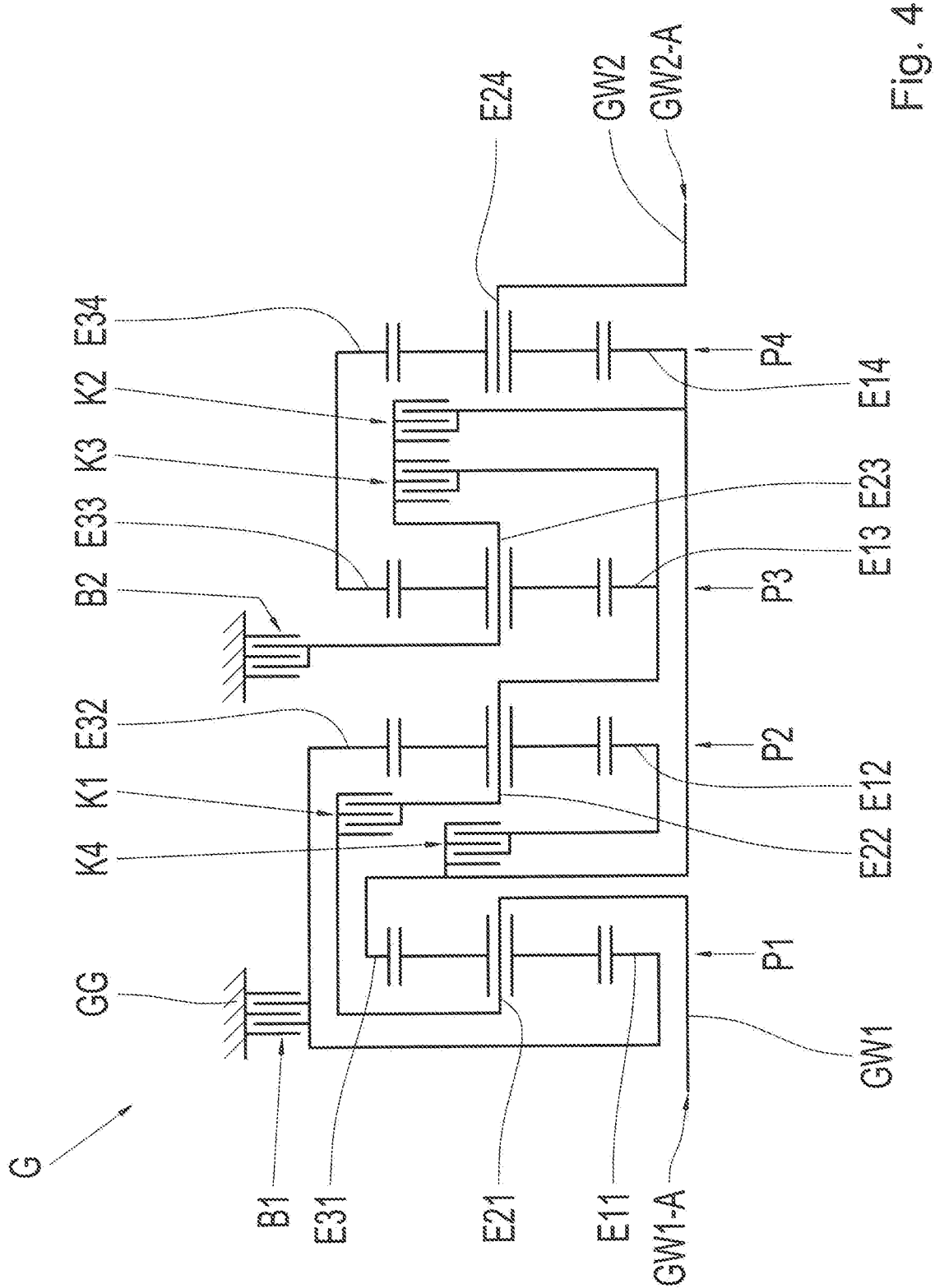
FIG. 4 shows a schematic view of a transmission according to a third embodiment of the invention.

FIG. 4 shows a schematic view of a transmission G according to a third embodiment option of the invention. Again, this embodiment option corresponds in turn largely to the variant of FIG. 2, wherein, in contrast the third element E32 of the second planetary gearset P2 is now permanently rotationally fixed to the first element E11 of the first planetary gearset P1. By contrast, the first element E12 of the second planetary gearset P2 is no longer permanently rotationally fixed to the third element E31 of the first planetary gearset P1 and the first element E14 of the fourth planetary gearset P4, but a rotatably fixed connection is established only by closing the sixth shift element K4. Compared to the variant according to FIG. 2, the sixth shift element K4 is arranged axially between the first planetary gearset P1 and the second shift element K1 and is located radially inwards of the second shift element K1 and axially immediately adjacent to the latter. In this respect, a common supply of the second shift element K1 and the sixth shift element K4 can be implemented here as well. Apart from that, the embodiment option according to FIG. 4 corresponds to the variant according to FIG. 2, i.e. reference is made to the description thereof.

Figure 5:
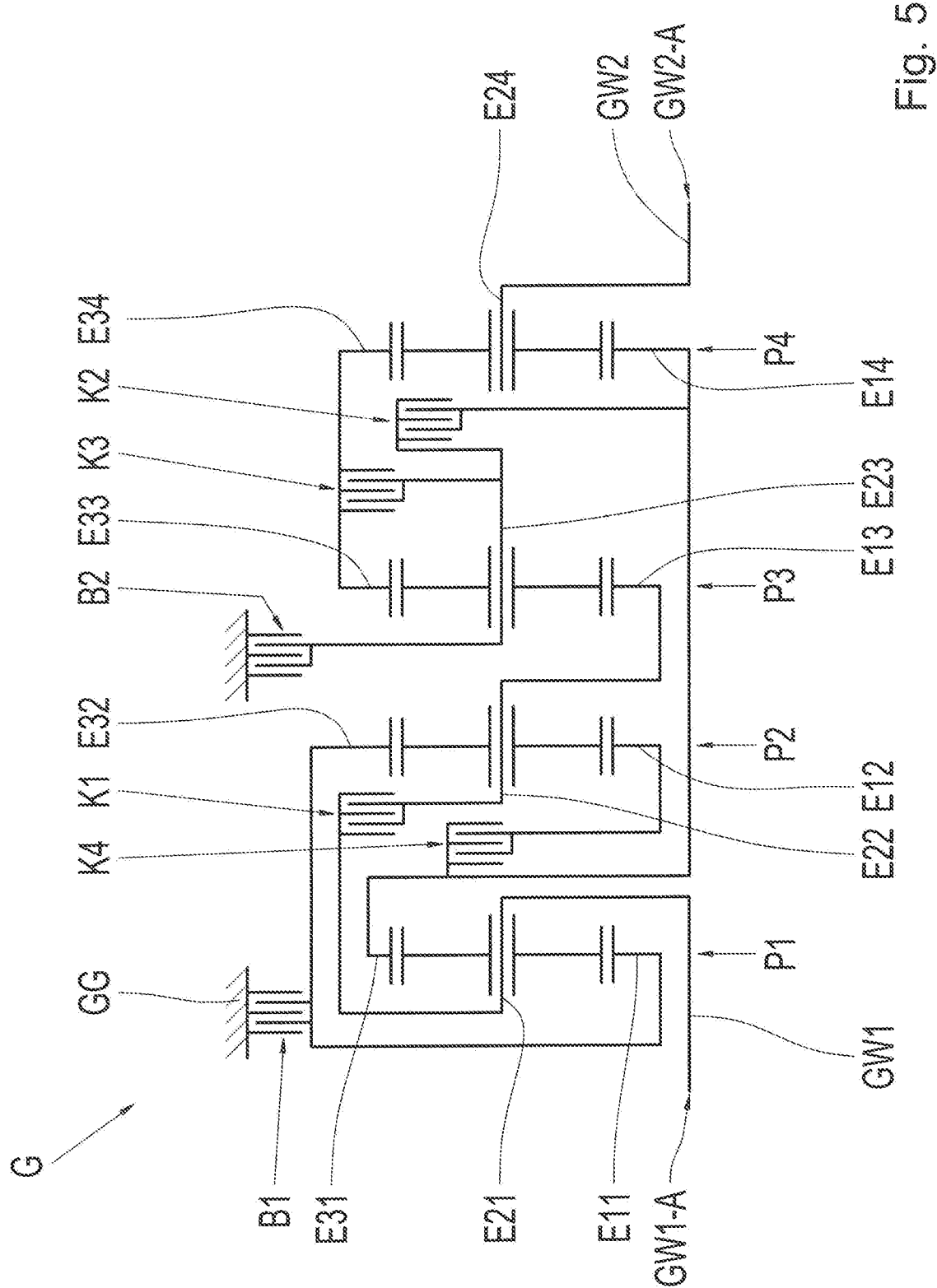
FIG. 5 shows a schematic representation of a transmission according to a fourth embodiment option of the invention.

Furthermore, FIG. 5 shows a schematic representation of a transmission G according to a fourth embodiment of the invention, which largely corresponds to the directly preceding variant according to FIG. 4. The difference is, however, that the fifth shift element K3 when actuated now rotationally fixes the second element E23 and the third element E33 of the third planetary gearset P3 to each other and in that way causes the third planetary gearset P3 to be locked. Due to the altered function of the fifth shift element K3 this is now offset radially further outward compared to the third shift element K2, but still arranged axially immediately adjacent thereto. Apart from that, the embodiment according to FIG. 5 corresponds to the variant according to FIG. 4, i.e. reference is made to the description thereof.

Figure 6:
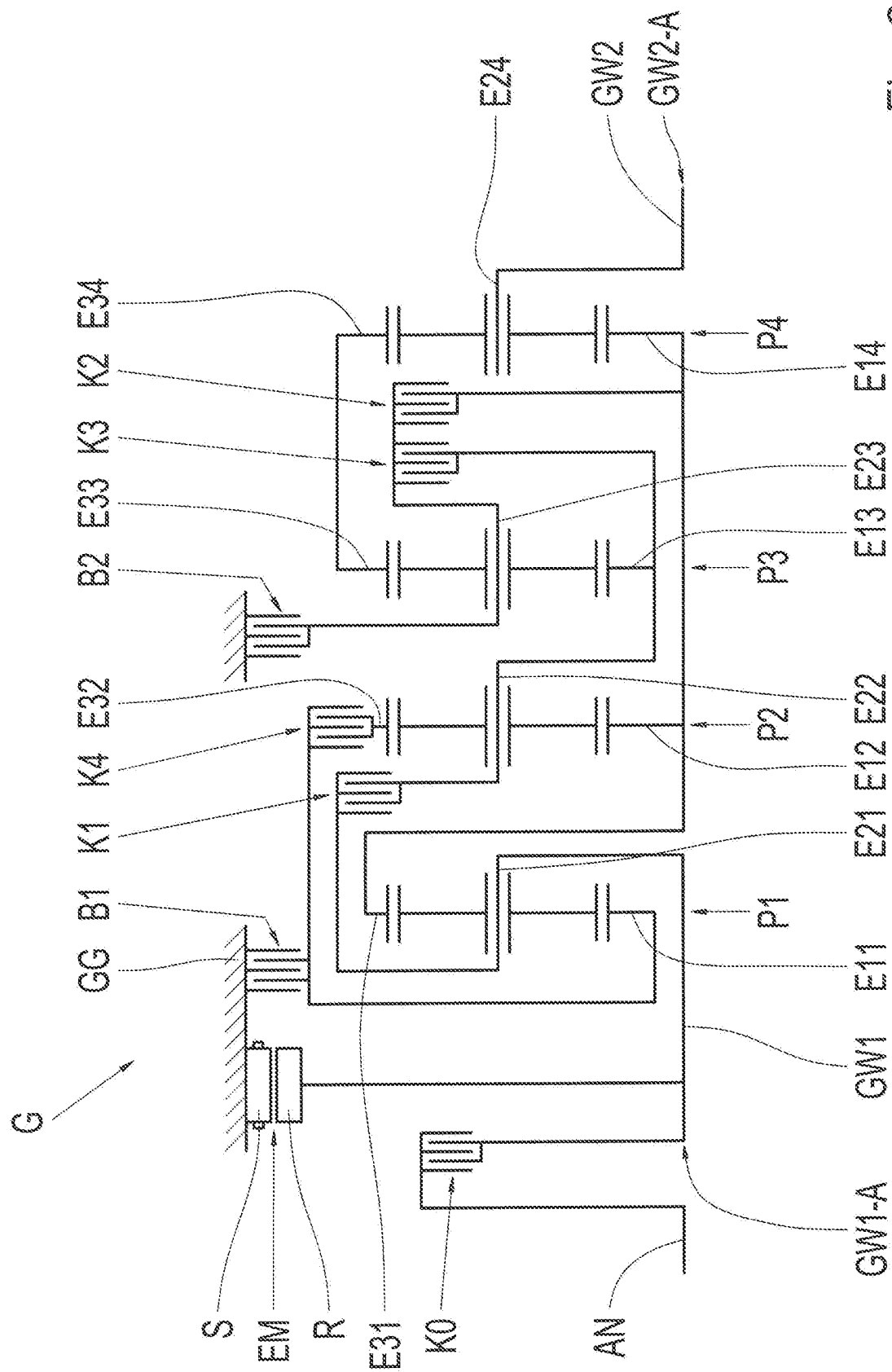
FIG. 6 shows a schematic view of a transmission according to a fifth embodiment of the invention.

Finally, FIG. 6 shows a schematic representation of a transmission G according to a fifth embodiment of the invention. This embodiment corresponds essentially to the variant of FIG. 2, wherein in contrast thereto, an electric machine EM is additionally provided, whose stator S is fixed to the non-rotating component GG and a rotor R of the electric machine EM is rotationally fixed to the drive shaft GW1. Furthermore, the drive shaft GW1 is rotationally fixed to a connecting shaft AN at the connection point GW1-A via an intermediate clutch K0, which is designed in this case as a multi-disk shift element, which connecting shaft in turn is connected to a crankshaft of the internal combustion engine VKM by means of the intermediate torsional vibration damper TS. Due to the rotationally fixed connection of the rotor R with the drive shaft GW1, the electric machine EM is placed coaxially with the drive shaft GW1.

The electric machine EM can be used to implement the purely electric drive mode, wherein in that case the separating clutch K0 is opened to decouple the drive shaft GW1 from the connecting shaft AN and to not entrain the internal combustion engine VKM. Otherwise, the embodiment according to FIG. 6 corresponds to the variant according to FIG. 2, i.e. reference is made to the description thereof.

FIG. 7 shows an exemplary circuit diagram for the transmissions G of FIGS. 2 to 6 in tabular form. As can be seen, in each case a total of eleven forward gears 1 to 11, and two reverse gears R1 and R2 can be implemented, wherein an X in the columns of the circuit diagram is use to mark which of the shift elements B1, K1, K2, B2, K3 and K4 is closed in which of the forward gears 1 to 11 and the reverse gears R1 and R2, respectively. Three of the shift elements B1, K1, K2, B2, K3 and K4 each are closed in each of the forward gears 1 to 11 and the reverse gears R1 and R2, wherein to achieve the forward gears 1 to 11 in succession, except for the variants 7.2, 7.3 and 7.4 of a seventh forward gear, one of the shift elements involved each has to be opened and another shift element has to be closed thereupon.

As can be seen in FIG. 7, a first forward gear 1 is achieved by actuating the second shift element K1, the fourth shift element K2 and the sixth shift element K4, wherein, based on that, a second forward gear 2 is formed by the sixth shift element K4 being opened and the first shift element B1 subsequently being closed. Furthermore, a third forward gear 3 is achieved opening the second shift element K1 and closing the sixth shift element K4b starting from the second forward gear 2. On that basis, a fourth forward gear 4 is achieved by opening the sixth shift element K4 and closing the fifth shift element K3. Subsequently, a fifth forward gear 5 is achieved by opening the first shift element B1 and actuating the sixth shift element K4, wherein, on that basis, a sixth forward gear 6 is achieved by opening the fourth shift element B2 and closing the first shift element B1.

To achieve to a seventh forward gear 7.1, the first shift element B1 then has to be opened and the second shift element K1 has to be closed. Alternatively, a seventh forward gear 7.2 can be achieved by opening both the first shift element B1, and the fifth shift element K3 and closing the second shift element K1 and the third shift element K2. Further alternatively, a seventh forward gear 7.3 can be formed by opening the first shift element B1 and the sixth shift element K4 and closing the second shift element K1 and the third shift element K2. Likewise, a seventh forward gear 7.4 results by opening the first shift element B1 and closing the third shift element K2 starting from the sixth forward gear 6. The seventh forward gear 7.1 is to be preferably used, because in this case only the shift state of two shift elements has to be changed to achieve the ratio.

Furthermore, an eighth forward gear 8 results by actuating the first shift element B1, the second shift element K1 and the fifth shift element K3. For further upshifting into a ninth forward gear 9, the second shift element K1 has to be opened and the third shift element K2 has to be closed. Furthermore, a tenth forward gear 10 is achieved from the ninth forward gear 9 by transferring the fifth shift element K3 to an unactuated state and subsequently transferring the second shift element K1 to an actuated state. Finally, an eleventh forward gear 11 results from the tenth forward gear 10 by opening the second shift element K1 and actuating the sixth shift element K4.

The first reverse gear R1, in which a reverse travel of the motor vehicle can be implemented even when driven by the internal combustion engine VKM, however, is achieved by closing the second shift element K1, the third shift element K2 and the fourth shift element B2. On the other hand, the second reverse gear is obtained by actuating the third shift element K2, the fourth shift element B2, the fourth and the sixth shift element K4.

As shown in FIGS. 2 to 6, the fourth shift element B2 is designed as a non-positive shift element. However, the fourth shift element B2 could also be implemented as a form-locking shift element, such as a dog clutch or a synchronizer unit.

Furthermore, the transmissions G in accordance with the embodiments of FIGS. 3 to 5 can also be hybridized in the manner of the variants according to FIG. 6.

A transmission with a compact design and a good efficiency can be implemented by means of the embodiments according to the invention.

REFERENCE NUMERALS

G transmission
GG non-rotating component
P1 first planetary gearset
E1 first element of the first planetary gearset
E21 second element of the first planetary gearset
E31 third element of the first planetary gearset
P2 second planetary gearset
E12 first element of the second planetary gearset
E22 second element of the second planetary gearset
E32 third element of the second planetary gearset
P3 third planetary gearset
E13 first element of the third planetary gearset
E23 second element of the third planetary gearset
E33 third element of the third planetary gearset
P4 fourth planetary gearset
E14 first element of the fourth planetary gearset
E24 second element of the fourth planetary gearset
E34 third element of the fourth planetary gearset
B1 first shift element
K1 second shift element
K2 third shift element
B2 fourth shift element
K3 fifth shift element
K4 sixth shift element
1 first forward gear
2 second forward gear
3 third forward gear
4 fourth forward gear
5 fifth forward gear
6 sixth forward gear
7.1 seventh forward gear
7.2 seventh forward gear
7.3 seventh forward gear
7.4 seventh forward gear
8 eighth forward gear
9 ninth forward gear
10 tenth forward gear
11 eleventh forward gear
R1 first reverse gear
R2 second reverse gear
GW1 drive shaft
GW1-A connection point
GW2 output shaft
GW2-A connection point
EM electric machine
S stator
R rotor
K0 clutch
VKM internal combustion engine
TS torsional vibration damper
AG axle drive
DW drive wheels

The invention claimed is:

1. A transmission for a motor vehicle, the transmission comprising:
a drive shaft,
an output shaft,
first, second, third and fourth planetary gearsets, the first, the second, the third and the fourth planetary gearsets each comprising a plurality of elements,
first, second, third, fourth, fifth and sixth shift elements being provided, and selective actuation of the first, the second, the third, the fourth, the fifth and the sixth shift elements implements different paths of a flow of power using the first, the second, the third and the fourth planetary gearsets and achieving different gears between the drive shaft and the output shaft,
the first element of the first planetary gearset being lockable via the first shift element to a non-rotating component, the second element of the first planetary gearset being rotationally fixed to the drive shaft and being rotationally fixable, via the second shift element, to both the second element of the second planetary gearset and the first element of the third planetary gearset, which are rotationally fixed to one another;
the third element of the first planetary gearset being rotationally fixed to the first element of the fourth planetary gearset and being rotationally fixable, via the third shift element, to the second element of the third planetary gearset, and the second element of the third planetary gearset being lockable to the non-rotating component via the fourth shift element;
the third element of the third planetary gearset and the third element of the fourth planetary gearset are permanently rotationally fixed to one another;
the second element of the fourth planetary gearset being rotationally fixed to the output shaft;
the third planetary gearset being blockable via the fifth shift element; and
the second planetary gearset has first and second couplings, the first coupling couples the first element of the second planetary gearset with the third element of the first planetary gearset and the first element of the fourth planetary gearset, and the second coupling couples the third element of the second planetary gearset to the first element of the first planetary gearset,
wherein one of the first and the second couplings is a permanently rotatably engaged connection, and the other one of the first and the second couplings is rotatably engaged connection that is established by engagement of the sixth shift element.

2. The transmission according to claim 1, wherein the first element of the second planetary gearset is rotationally fixed to the third element of the first planetary gearset and the first element of the fourth planetary gearset, and the third element of the second planetary gearset is rotationally fixable, via the sixth shift element, to the first element of the first planetary gearset.

3. The transmission according to claim 1, wherein the third element of the second planetary gearset is rotationally fixed to the first element of the first planetary gearset, and the first element of the second planetary gearset is rotationally fixable, via the sixth shift element, to the third element of the first planetary gearset and the first element of the fourth planetary gearset.

4. The transmission according to claim 1, wherein engagement of the fifth shift element rotationally fixes either the first element of the third planetary gearset to the second element of the third planetary gearset or the second element of the third planetary gearset to the third element of the third planetary gearset.

5. The transmission according to claim 1, wherein a first forward gear is implemented by engagement of the second, the fourth and the sixth shift elements,
- a second forward gear is implemented by engagement of the first, second and fourth shift elements,
- a third forward gear is implemented by engagement of the first, fourth and sixth shift elements,
- a fourth forward gear is implemented by engagement of the first, the fourth and the fifth shift elements,
- a fifth forward gear is implemented by engagement of the fourth, the fifth and the sixth shift elements,
- a sixth forward gear is implemented by engagement of the first, the fifth and the sixth shift elements,
- a seventh forward gear is implemented by engagement of:
  - the second, the fifth and the sixth shift elements,
  - the second, the third and the sixth shift elements,
  - the second, the third and the fifth shift elements, or
  - the third, the fifth and the sixth shift elements,
- an eighth forward gear is implemented by engagement of the first, the second and the fifth shift elements,
- a ninth forward gear is implemented by engagement of the first, the third and the fifth shift elements,
- a tenth forward gear is implemented by engagement of the first, the second and the third shift elements,
- an eleventh forward gear is implemented by engagement of the first, the third and sixth shift elements,
- a first reverse gear is implemented by engagement of the second, the third and fourth shift elements, and
- a second reverse gear is implemented by engagement of the third, the fourth and the sixth shift elements.

6. The transmission according to claim 1, wherein at least one of first, the second, the third and the fourth planetary gearsets is a minus planetary gearset, and the first element thereof is a sun gear, the second element thereof is a planetary carrier and the third element thereof is a ring gear.

7. The transmission according to claim 1, wherein at least one of first, the second, the third and the fourth planetary gearsets is plus planetary gearset, and the first element thereof is a sun gear, the second element thereof is a ring gear and the third element thereof is a planetary carrier.

8. The transmission according to claim 1, wherein at least one of first, the second, the third, the fourth, the fifth and the sixth shift elements is force-locking shift element.

9. The transmission according to claim 1, wherein the fourth shift element is a form-locking shift element.

10. The transmission according to claim 1, wherein the drive shaft and the output shaft are coaxial to one another and each form a connection point, and the connection point of the drive shaft and the connection point of the output shaft are located at opposite axial ends.

11. The transmission according to claim 1, further comprising an electric machine having a rotor which is coupled to a rotatable component.

12. The transmission according to claim 1, further comprising a clutch, via which the drive shaft is rotationally fixed to a connecting shaft.

13. The transmission according to claim 1, wherein the transmission is incorporated into a drive train of a motor vehicle and further comprising a clutch, via which the drive shaft is rotationally fixed to an engine.

14. A drive train of a motor vehicle, comprising a transmission comprising:
- a drive shaft,
- an output shaft,
- first, second, third and fourth planetary gearsets, the first, the second, the third and the fourth planetary gearsets each comprising a plurality of elements,
- first, second, third, fourth, fifth and sixth shift elements being provided, and selective actuation of the first, the second, the third, the fourth, the fifth and the sixth shift elements implements different paths of a flow of power using the first, the second, the third and the fourth planetary gearsets and achieving different gears between the drive shaft and the output shaft,
- the first element of the first planetary gearset being lockable via the first shift element to a non-rotating component, the second element of the first planetary gearset being rotationally fixed to the drive shaft and being rotationally fixable, via the second shift element, to both the second element of the second planetary gearset and the first element of the third planetary gearset, which are rotationally fixed to one another;
- the third element of the first planetary gearset being rotationally fixed to the first element of the fourth planetary gearset and being rotationally fixable, via the third shift element, to the second element of the third planetary gearset, and the second element of the third planetary gearset being lockable to the non-rotating component via the fourth shift element;
- the third element of the third planetary gearset and the third element of the fourth planetary gearset are permanently rotationally fixed to one another;
- the second element of the fourth planetary gearset being rotationally fixed to the output shaft;
- the third planetary gearset being blockable via the fifth shift element; and
- the second planetary gearset has first and second couplings, the first coupling couples the first element of the second planetary gearset with the third element of the first planetary gearset and the first element of the fourth planetary gearset, and the second coupling couples the third element of the second planetary gearset to the first element of the first planetary gearset,
- wherein one of the first and the second couplings is a permanently rotatably engaged connection, and the other one of the first and the second couplings is rotatably engaged connection that is established by engagement of the sixth shift element.

15. A transmission for a motor vehicle, the transmission comprising:
- a drive shaft;
- an output shaft;
- first, second, third and fourth planetary gearsets, and each of the first planetary gearset, the second planetary gearset, the third planetary gearset and the fourth planetary gearset having a first element, a second element and a third element;

first, second, third, fourth, fifth and sixth shift elements, and selective actuation of the first, the second, the third, the fourth, the fifth and the sixth shift elements establishing different power flow paths through the first, the second, the third, and the fourth planetary gearsets to implement different gears between the drive shaft and the output shaft;

the first element of the first planetary gearset being rotationally fixed, by engagement of the first shift element, to a non-rotating housing component;

the second element of the first planetary gearset being rotationally fixed to the drive shaft and being is rotationally fixable, by engagement of the second shift element, to the second element of the second planetary gearset;

the second element of the second planetary gearset being permanently rotationally fixed to the first element of the third planetary gearset;

the third element of the first planetary gearset is permanently rotationally fixed to the first element of the fourth planetary gearset and being rotationally fixable, by engagement of the third shift element, to the second element of the third planetary gearset;

the second element of the third planetary gearset being rotationally fixable, by engagement of the fourth shift element, to the non-rotating housing component;

the third element of the third planetary gearset is permanently rotationally fixed to the third element of the fourth planetary gearset;

the second element of the fourth planetary gearset is permanently rotationally fixed to the output shaft;

the second element of the third planetary gearset is rotationally fixable, by engagement of the fifth shift element, to either the first element of the of the third planetary gearset or the third element of the third planetary gearset; and the second planetary gearset comprises first and second couplings, the first coupling connects the first element of the second planetary gearset to the third element of the first planetary gearset and the first element of the fourth planetary gearset, and the second coupling connects the third element of the second planetary gearset to the first element of the first planetary gearset, and one of the first and the second couplings being a permanent rotationally connection, and the other one of the first and the second couplings being a releasable rotationally fixed connection achieved by selective engagement of the sixth shift element.

\* \* \* \* \*